United States Patent
Batchu

(10) Patent No.: US 11,620,372 B2
(45) Date of Patent: Apr. 4, 2023

(54) APPLICATION EXTENSION-BASED AUTHENTICATION ON A DEVICE UNDER THIRD PARTY MANAGEMENT

(71) Applicant: Ivanti, Inc., South Jordan, UT (US)

(72) Inventor: Suresh Kumar Batchu, Campbell, CA (US)

(73) Assignee: Ivanti, Inc., South Jordan, UT (US)

( * ) Notice: Subject to any disclaimer, the term of this patent is extended or adjusted under 35 U.S.C. 154(b) by 277 days.

(21) Appl. No.: 16/906,915

(22) Filed: Jun. 19, 2020

(65) Prior Publication Data

US 2021/0397694 A1 Dec. 23, 2021

(51) Int. Cl.
| | |
|---|---|
| *G06F 21/41* | (2013.01) |
| *G06F 21/30* | (2013.01) |
| *G06F 21/44* | (2013.01) |
| *H04L 9/40* | (2022.01) |
| *G06F 21/45* | (2013.01) |
| *G06F 21/60* | (2013.01) |
| *G06F 21/00* | (2013.01) |

(52) U.S. Cl.
CPC ............ *G06F 21/41* (2013.01); *G06F 21/305* (2013.01); *G06F 21/44* (2013.01); *G06F 21/45* (2013.01); *G06F 21/604* (2013.01); *H04L 63/107* (2013.01)

(58) Field of Classification Search
CPC .......... G06F 21/41; G06F 21/44; G06F 21/45; G06F 21/604; G06F 21/42; G06F 21/6236; H04L 63/10
See application file for complete search history.

(56) References Cited

U.S. PATENT DOCUMENTS

| | | | |
|---|---|---|---|
| 2009/0217367 A1* | 8/2009 | Norman | H04L 63/0815 726/8 |
| 2014/0250511 A1* | 9/2014 | Kendall | G06F 21/44 726/6 |
| 2019/0207927 A1 | 7/2019 | Lakhani et al. | |
| 2020/0092281 A1 | 3/2020 | Volkov et al. | |
| 2020/0287910 A1 | 9/2020 | Zerrad et al. | |

OTHER PUBLICATIONS

International Search Report and Written Opinion for Application No. PCT/US2021/038295, dated Oct. 7, 2021, 10 pages.

* cited by examiner

*Primary Examiner* — Edward Zee

(74) *Attorney, Agent, or Firm* — Van Pelt, Yi & James LLP

(57) ABSTRACT

Techniques are disclosed to provide application extension-based authentication on a device under third party management. In various embodiments, a unique identifier associated with an authentication app is stored on the device. An app extension framework that enables a native app to request, via an app extension associated with the authentication app, access to a service with which the native app is associated is provided. The authentication app is configured to use the unique identifier to determine a security posture of the device and to grant or deny access to the service based at least in part on the security posture of the device.

20 Claims, 4 Drawing Sheets

APPLICATION EXTENSION-BASED AUTHENTICATION ON A DEVICE UNDER THIRD PARTY MANAGEMENT

BACKGROUND OF THE INVENTION

Mobile device operating systems, such as Apple's iOS, include an application extension ("app extension") framework. App extensions can be configured to use the framework to provide a "single sign on" (SSO) experience. For example, a native app associated with a cloud-based service may be configured to invoke an SSO-type extension of another app on the same device, which may enable a user to be authenticated and gain access via the native app to an associated cloud-based service. However, in current implementations, the SSO extension may not have access to a unique device identifier that may be required to check a security posture of the device, such as by calling a third party Unified Endpoint Management (UEM) and/or similar device management solution or service.

BRIEF DESCRIPTION OF THE DRAWINGS

Various embodiments of the invention are disclosed in the following detailed description and the accompanying drawings.

DETAILED DESCRIPTION

Figure 1:
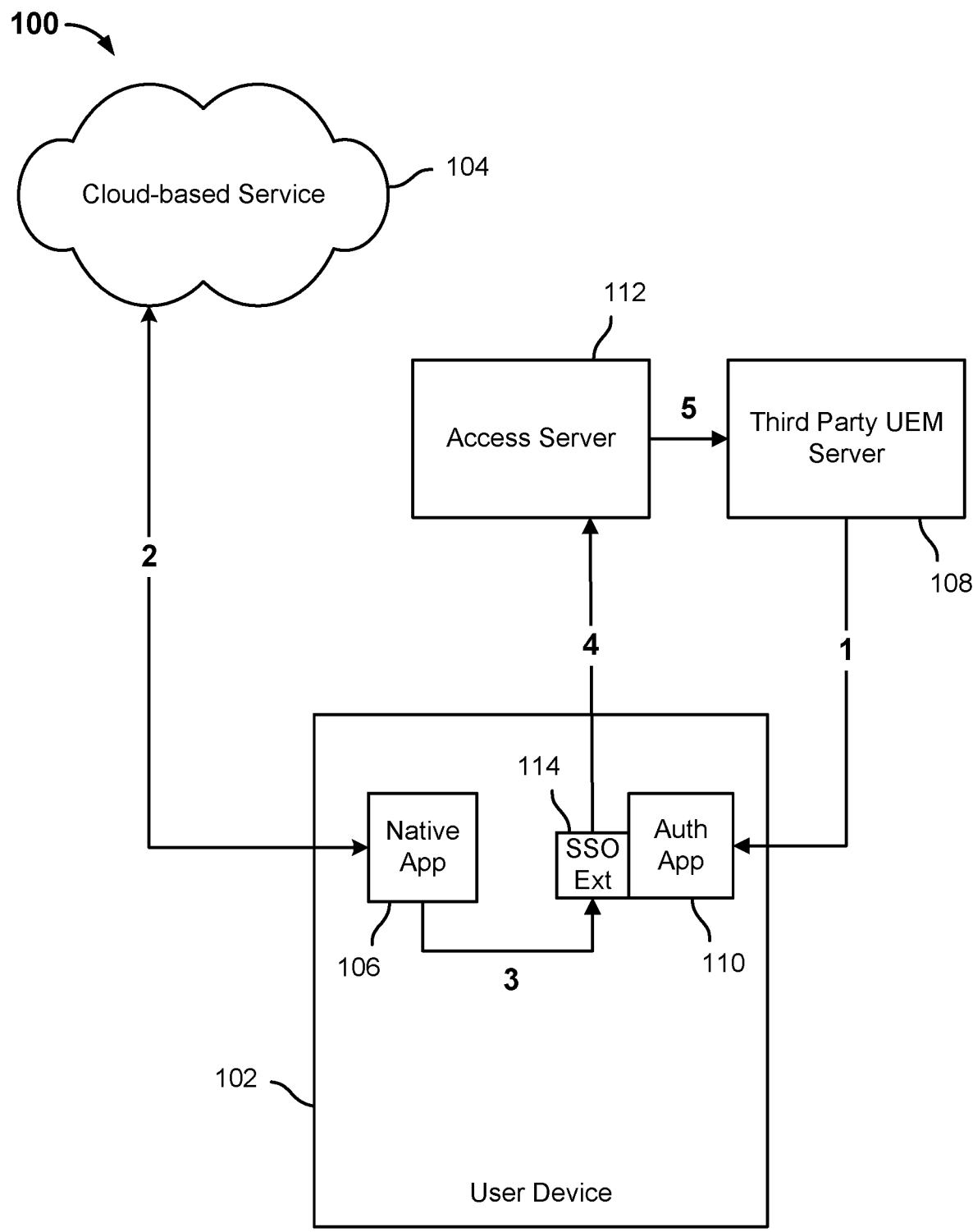
FIG. 1 is a block diagram illustrating an embodiment of a system to provide secure access to a service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to use an app extension to provide single sign-on (SSO) functionality. In various embodiments, an authenticator app is installed on a device, e.g., by a UEM or other vendor/server configured to manage the device. The UEM (or similar entity) provisions the authenticator app with a unique identifier other than a device identifier of the device, e.g., an identifier generated by a vendor of the authenticator app. The device and/or a native app installed on the device is/are configured to associate an SSO app extension of the authenticator app with the native app. For example, the native app and/or device may be configured to provide authentication requests from the native app to an SSO app extension of the authenticator app. The authenticator app uses the unique identifier to conduct a device posture check prior to granting access to a service with which the native app is associated. For example, in some embodiments, the authenticator app sends the unique identifier to an access node associated with the authenticator app, such as an access server configured to act as an identity provider with respect to access to the service with which the native app is associated. The access node uses the identifier to obtain device posture information from the UEM. For example, in some embodiments, the access node maps the identifier to a device identifier and uses the device identifier to query the UEM for device posture information; or, the access node sends the identifier to the UEM, which maps the identifier to the device identifier and returns device posture information. The access node provides a response comprising and/or based on the device posture information to the authenticator app, which allows or blocks access to the service based on the response.

FIG. 1 is a block diagram illustrating an embodiment of a system to provide secure access to a service. In the example shown, a user device 102, such as a mobile device, is configured to access a cloud-based service 104 via a native app 106 installed on device 102. For example, a user of device 102 may need to access the cloud-based service 104 to perform their job. The device 102 is managed by a Unified Endpoint Management (UEM) server 108. UEM server 108 is configured, in various embodiments, to install an authenticator app 110 onto device 102. The authenticator app 110 is associated with a first part access server 112 configured to act as an identity provider with respect to cloud-based service 104. The access server 112 is not a part of the same UEM (or other management) solution as UEM server 108, in this example, which is why UEM server 108 is labeled as a "third party" UEM server.

In the example shown, authenticator app 110 is configured to provide access to cloud-based service 104 via a single sign-on (SSO) extension 114. In various embodiments, UEM server 108 configures authenticator app 110, including by providing to authenticator app 110 a unique identifier associated with device 102. In some environments, the unique identifier is the device identifier associated with the device hardware and/or operating system instance (e.g., iOS in the case of an Apple™ iOS device). In some embodiments, the unique identifier is not a device-vendor (or operating system vendor) defined unique device identifier of the device 102. For example, the UEM vendor or another entity may assign the unique device identifier to the device 102. In some device operating systems, an app extension such as SSO extension 114 does not have access to the device vendor-defined or other unique device identifier required to check device posture, e.g., by querying UEM server 108 directly. In some embodiments, a unique identifier associated with access server 112, e.g., one defined by access server 112 and/or a vendor with which one or both of authenticator app 110 and access server 112, is provided to the authenticator app 110 by UEM server 108 (arrow labeled "1" in FIG. 1).

Referring further to the example shown in FIG. 1, when native app 106 is launched to access service 104 (arrow labeled "2" in FIG. 1), the native app 106 is redirected to SSO extension 114 associated with authenticator app 110 to obtain authorization to access service 104 (arrow labeled "3" in FIG. 1). SSO extension 114 is configured to respond by sending to access server 112 an access request that includes the unique identifier supplied to authenticator app 110 by UEM server 108 (arrow labeled "4" in FIG. 1). Access server 112 maps the received identifier to the corresponding device-vendor defined unique device identifier and uses the device-vendor defined unique device identifier to obtain device posture information from UEM server 108 (arrow labeled "5" in FIG. 1).

If the response from UEM server 108 indicates the device 102 is in a compliant/secure state (e.g., not jailbroken, not in a location or other context from which access to service 104 is prohibited by policy, etc.), access server 112 sends to SSO extension a response that indicates access is permitted. In some embodiments, the response includes a security token or other credential to access the service 104. SSO extension 114 provides the token to the native app 106, which presents the token to service 104 and gains access to the service 104.

If the response from UEM server 108 indicates the device 102 is not in a compliant/secure state, access server 112 sends to SSO extension a response that indicates access is not permitted and SSO extension 114 provides to native app 106 a response that indicates access to the service 104 is not permitted.

In some embodiments, single sign-on access via SSO extension 114 may be denied for reasons other than the device being in a non-compliant state, such as a policy or configuration data requiring that a user re-authenticate (e.g. biometrics, enter username and password, etc.) after a certain amount of time has passed, etc.

Figures 2A, 2B:
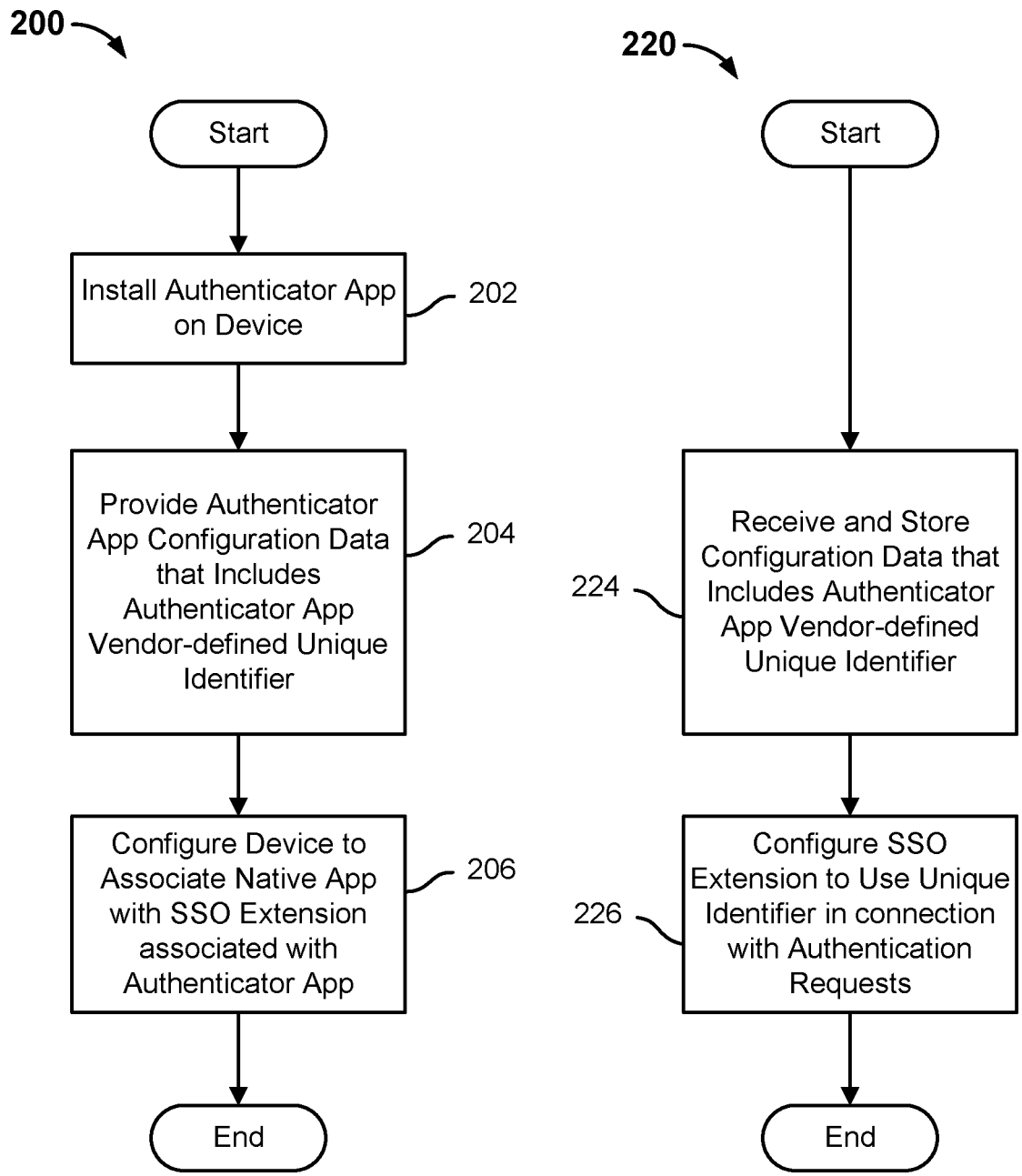
FIG. 2A is a flow chart illustrating an embodiment of a process to configure a device to provide secure access to a service.
FIG. 2B is a flow chart illustrating an embodiment of a process to configure a device to provide secure access to a service.

FIG. 2A is a flow chart illustrating an embodiment of a process to configure a device to provide secure access to a service. In various embodiments, the process 200 of FIG. 2A is performed by an endpoint management entity, such as UEM server 108 of FIG. 1. In the example shown, at 202 an authenticator app, such as authenticator app 110 of FIG. 1, is installed on the device. For example, the authenticator app may be pushed to the device in connection with provisioning the device and/or brining the device under management. At 204, the authenticator app is provided with configuration data that includes an authenticator app vendor-defined unique identifier. At 206, an SSO extension service of the device is configured to associate a native app, such as native app 106, with an SSO extension of the authenticator app installed at 202. For example, the device is configured to direct authentication requests by and/or from native app 106 to the SSO extension of the authenticator app, such as SSO extension 114 of FIG. 1.

FIG. 2B is a flow chart illustrating an embodiment of a process to configure a device to provide secure access to a service. In various embodiments, the process 220 of FIG. 2B is performed by an authentication app installed on a device, such as authenticator app 110 of FIG. 1. In the example shown, at 224, the authenticator app and/or SSO extension thereof receives and stores configuration data that includes an authenticator app vendor-defined unique identifier. At 226, the authenticator app and/or SSO extension configures the extension to use the authenticator app vendor-defined unique identifier in connection with authentication requests, e.g., by including the identifier in authentication requests sent to an associated access node, such as access server 112 of FIG. 1.

Figures 3A, 3B:
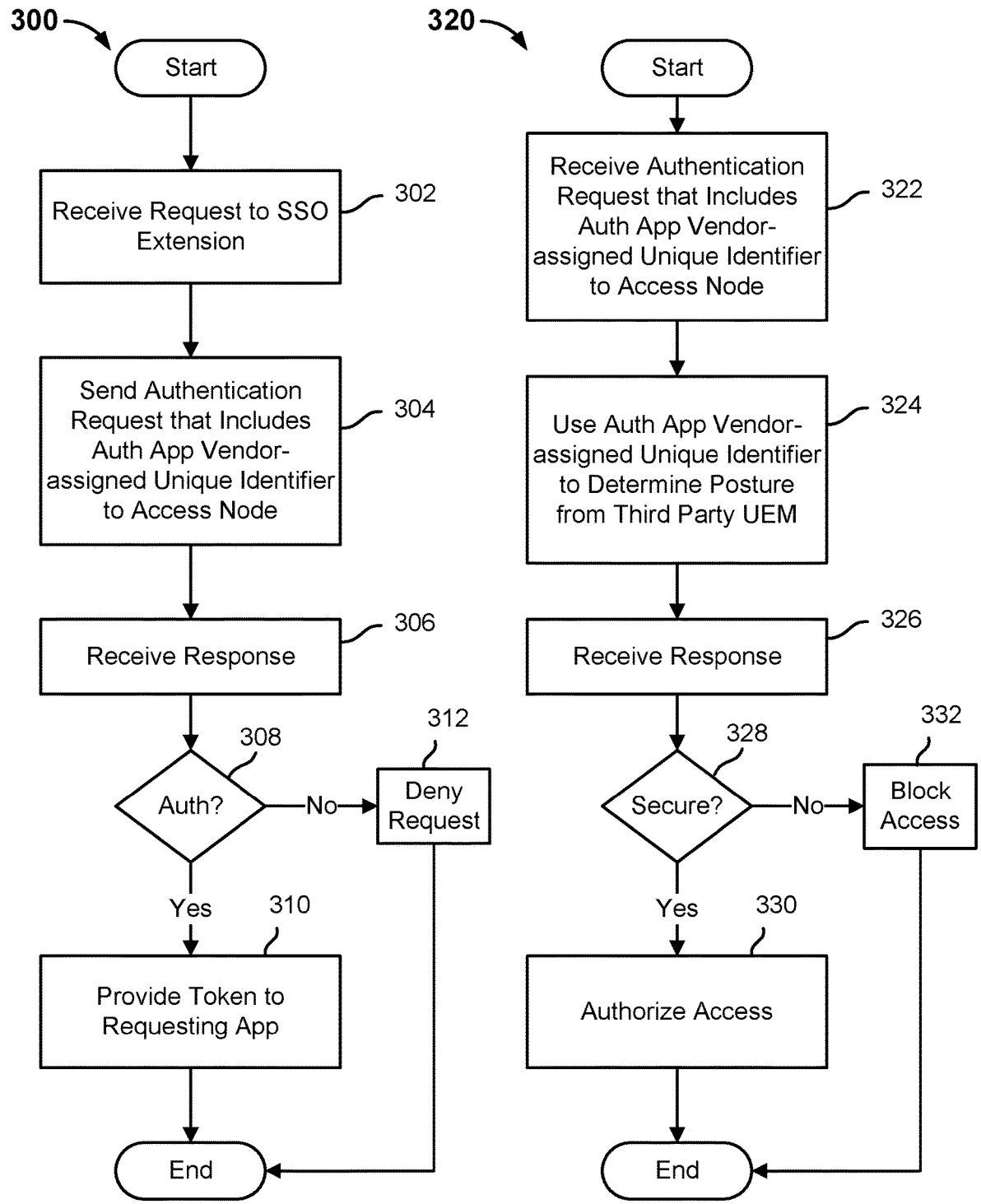
FIG. 3A is a flow chart illustrating an embodiment of a process to facilitate obtaining secure access to a service.
FIG. 3B is a flow chart illustrating an embodiment of a process to provide secure access to a service.

FIG. 3A is a flow chart illustrating an embodiment of a process to facilitate obtaining secure access to a service. In various embodiments, the process 300 of FIG. 3A is performed by an authentication app and/or associated SSO extension, such as authenticator app 110 and/or SSO extension 114 of FIG. 1. In the example shown, at 302 a request to access a service is received at the SSO extension, e.g., from a native app such as native app 106 of FIG. 1. At 304, the SSO extension sends an authentication request that includes an authentication app vendor-defined unique identifier to an access node, such as access server 112 of FIG. 1. At 306, a response is received from the access node. If the response is determined at 308 to indicate that access is to be permitted, at 310 a token to access the service is provided to the native app that sent the request received at 302. If the response from the access node is determined at 308 to indicate access is not allowed, at 312 a response denying the access request is provided to the native app that sent the request received at 302.

FIG. 3B is a flow chart illustrating an embodiment of a process to provide secure access to a service. In various embodiments, the process 320 of FIG. 3B is performed by one or both of an access node/server, such as access server 112 of FIG. 1, and a third part management server, such as UEM server 108 of FIG. 1. In the example shown, at 322, an authentication request that includes an authenticator app vendor-defined unique identifier is received, e.g., at an access node such as access server 112 of FIG. 1. The authenticator app vendor-defined unique identifier is used at 324 to obtain device posture (and/or other compliance and policy information) from a third party UEM or other management server configured to manage the device, such as UEM server 108 of FIG. 1. In some embodiments, the access node/server stores a mapping that maps authenticator app vendor-defined unique identifier to a device vendor-defined device identifier of the device, and the access node/servers uses the device vendor-defined device identifier to query the UEM server. In some embodiments, the UEM server stores the mapping, and the access node/server uses the authenticator app vendor-defined unique identifier to query the UEM server.

Referring further to FIG. 3B, at 326 a response is received from the UEM (or other management) server, and it is determined at 328, based at least in part on the response, whether access is to be permitted or blocked. In some embodiments, the response received at 326 includes security state information to which one or more policies may be applied at the access node to determine whether access is to be allowed. In some embodiments, the response received at 326 may include an explicit indication to block access, e.g., based on a policy applied and/or administrative action taken at the UEM server.

If the response from the UEM server (326, 328) indicates access is to be allowed, at 330 a response authorizing access 330 is returned to the authenticator app and/or SSO extension from which the request at 322 was received. In some embodiments, the response sent at 330 includes a SAML or other token to access the service. If the response from the UEM server (326, 328) indicates access is to be blocked, at 332 a response to block access is sent to the authenticator app and/or SSO extension from which the request at 322 was received.

Figure 4:
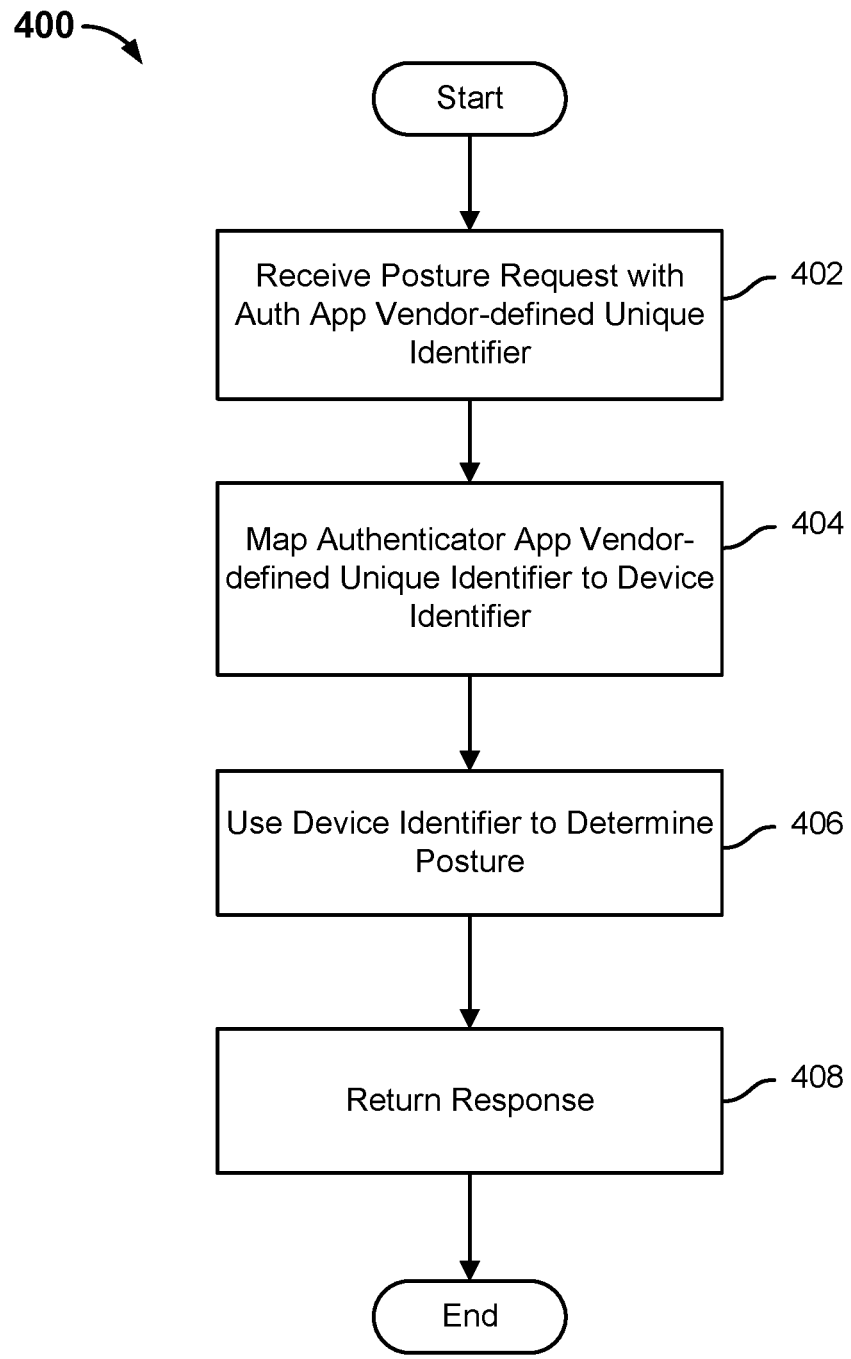
FIG. 4 is a flow chart illustrating an embodiment of a process to provide device posture information in connection with a request to access a service.

FIG. 4 is a flow chart illustrating an embodiment of a process to provide device posture information in connection with a request to access a service. In various embodiments, the process 400 of FIG. 4 is performed by one or both of an access node/server, such as access server 112 of FIG. 1. In the example shown, at 402 a request for device security posture information is received. The request includes an authenticator app or other non-device vendor-defined unique identifier. At 404, the identifier received at 402 is mapped to a device vendor-defined device identifier. At 406, the device identifier is used to determine the device posture information; and at 408 the device posture information is returned in response to the request received at 402.

In various embodiments, techniques disclosed herein may be used by a first party authentication app to provide secure access to a cloud-based service via a native app, including single sign-on access, including on a device managed by a third party UEM or other management solution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   a memory configured to store a unique device identifier associated with an authentication app; and
   a processor coupled to the memory and configured to provide an app extension framework that enables a native app to request, via an app extension associated with the authentication app, access to a service with which the native app is associated, the authentication app being configured to use the unique device identifier to determine a security posture of the device and to grant or deny access to the service based at least in part on the security posture of the device;
   wherein the authentication app is configured to determine the security posture of the device at least in part by using the unique device identifier to query an access server with which the authentication app is associated; and
   wherein the unique device identifier is different from a device vendor-assigned primary device identifier of the device and the access server is configured to map the unique device identifier to the device vendor-assigned primary device identifier of the device; and to use the device vendor-assigned primary device identifier of the device to obtain the security posture of the device from a third party device management server configured to manage the device.

2. The device of claim 1, wherein the unique device identifier is different from a device vendor-assigned primary device identifier of the device.

3. The device of claim 1, wherein the unique device identifier comprises a device vendor-assigned primary device identifier of the device.

4. The device of claim 1, wherein the authentication app is installed on the device by the third party device management server configured to manage the device.

5. The device of claim 4, wherein the third party device management server is further configured to provide the unique device identifier to the authentication app as installed on the device.

6. The device of claim 1, wherein the app extension comprises a single sign-on extension.

7. The device of claim 1, wherein the unique device identifier is different from a device vendor-assigned primary device identifier of the device and an operating system of the device prevents the authentication app from accessing a device vendor-assigned primary device identifier of the device.

8. The device of claim 1, wherein the processor is further configured to route service access requests generated by the native app to the app extension associated with the authentication app.

9. The device of claim 1, wherein the security posture is based at least in part on data indicating whether the device has been compromised.

10. The device of claim 1, wherein the security posture is based at least in part on data indicating whether the service is permitted to be access via the device in a current context associated with the device.

11. The device of claim 1, wherein the authentication app is configured to grant access at least in part by providing to the native app a token or other access data to access the service.

12. The device of claim 11, wherein the authentication app receives token or other access data to access the service from an access server with which the authentication app is configured to communicate to determine the security posture of the device.

13. A method, comprising:
   storing a unique device identifier associated with an authentication app on a device;
   providing an app extension framework that enables a native app to request, via an app extension associated with the authentication app, access to a service with which the native app is associated, the authentication app being configured to use the unique device identifier to determine a security posture of the device and to grant or deny access to the service based at least in part on the security posture of the device;
   wherein the authentication app is configured to determine the security posture of the device at least in part by using the unique device identifier to query an access server with which the authentication app is associated; and
   wherein the unique device identifier is different from a device vendor-assigned primary device identifier of the device and the access server is configured to map the unique device identifier to the device vendor-assigned primary device identifier of the device; and to use the device vendor-assigned primary device identifier of the device to obtain the security posture of the device from a third party device management server configured to manage the device.

14. The method of claim 13, wherein the authentication app is installed on the device by the third party device management server configured to manage the device.

15. The method of claim 14, wherein the third party device management server is further configured to provide the unique device identifier to the authentication app as installed on the device.

16. The method of claim 13, wherein the authentication app is configured to grant access at least in part by providing to the native app a token or other access data to access the service.

17. The method of claim 16, wherein the authentication app receives token or other access data to access the service from an access server with which the authentication app is configured to communicate to determine the security posture of the device.

18. A computer program product embodied in a non-transitory computer readable medium and comprising computer instructions for:

storing a unique device identifier associated with an authentication app on a device;

providing an app extension framework that enables a native app to request, via an app extension associated with the authentication app, access to a service with which the native app is associated, the authentication app being configured to use the unique device identifier to determine a security posture of the device and to grant or deny access to the service based at least in part on the security posture of the device;

wherein the authentication app is configured to determine the security posture of the device at least in part by using the unique device identifier to query an access server with which the authentication app is associated; and wherein the unique device identifier is different from a device vendor-assigned primary device identifier of the device and the access server is configured to map the unique device identifier to the device vendor-assigned primary device identifier of the device; and to use the device vendor-assigned primary device identifier of the device to obtain the security posture of the device from a third party device management server configured to manage the device.

19. The computer program product of claim 18, wherein the authentication app is installed on the device by the third party device management server configured to manage the device.

20. The computer program product of claim 19, wherein the third party device management server is further configured to provide the unique device identifier to the authentication app as installed on the device.

* * * * *